United States Patent [19]
Wheeler

[11] Patent Number: 5,272,025
[45] Date of Patent: * Dec. 21, 1993

[54] PHOTOGRAPH AND ASSOCIATED GRAPHICS WITH ASSOCIATED DIGITIZED FORMATTING, AND METHOD OF PRODUCTION AND USE THEREOF

[76] Inventor: Douglas E. Wheeler, 1715 Enclave Pkwy., #307, Houston, Tex. 77077

[*] Notice: The portion of the term of this patent subsequent to May 21, 2008 has been disclaimed.

[21] Appl. No.: 695,229

[22] Filed: May 3, 1991

Related U.S. Application Data

[63] Continuation-in-part of Ser. No. 679,249, Apr. 2, 1991, abandoned, which is a continuation-in-part of Ser. No. 501,495, Mar. 30, 1990, abandoned.

[51] Int. Cl.⁵ ................................................ G03C 3/00
[52] U.S. Cl. ...................................... 430/14; 382/42; 354/76
[58] Field of Search ............. 430/14; 382/42; 354/76; 350/154

[56] References Cited

U.S. PATENT DOCUMENTS

| | | | |
|---|---|---|---|
| 1,957,043 | 5/1934 | Harlow | 350/134 |
| 4,717,930 | 1/1988 | Wheeler . | |
| 4,720,871 | 1/1988 | Chambers | 382/42 |
| 4,758,485 | 7/1988 | Drexler | 430/12 |
| 4,849,912 | 7/1989 | Leberl et al. | 382/42 |
| 4,863,819 | 9/1989 | Drexler et al. | 430/14 |
| 4,924,521 | 5/1990 | Dinan et al. | 382/54 |
| 4,924,522 | 5/1990 | Bray et al. | 382/56 |
| 5,017,952 | 5/1992 | Wheeler | 354/76 |

Primary Examiner—Marion E. McCamish
Assistant Examiner—Mark A. Chapman
Attorney, Agent, or Firm—William W. Haefliger

[57] ABSTRACT

A composite comprising a carrier sheet of photograph size, and having front and back sides, and a camera-produced photographic image on a photographic print at the front side of the carrier sheet, and a graphics-produced image on at least one side of the sheet; a first digitized format on the back side of the carrier sheet, the format corresponding to the photographic image whereby the image is stored in the format, and a second digitized format on the back side of the carrier sheet, the second format corresponding to the graphics-produced image, the formats characterized as machine readable to produce a CRT display on the photographic image, and of the graphics-produced image in association with the photographic image display.

38 Claims, 7 Drawing Sheets

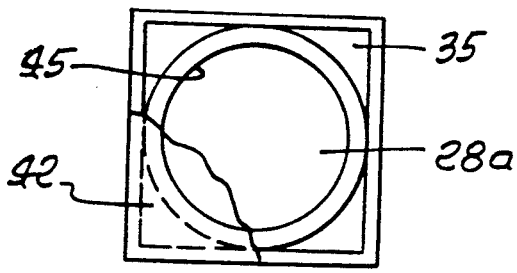
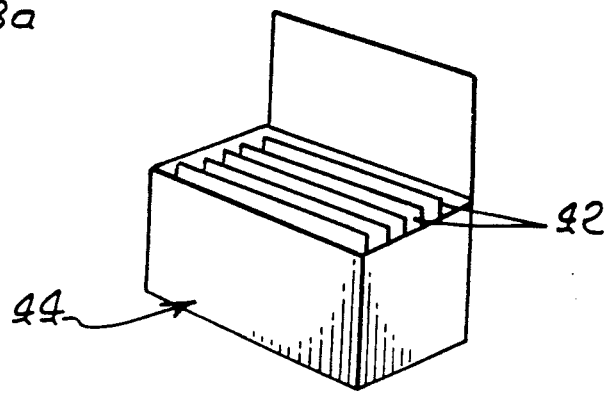
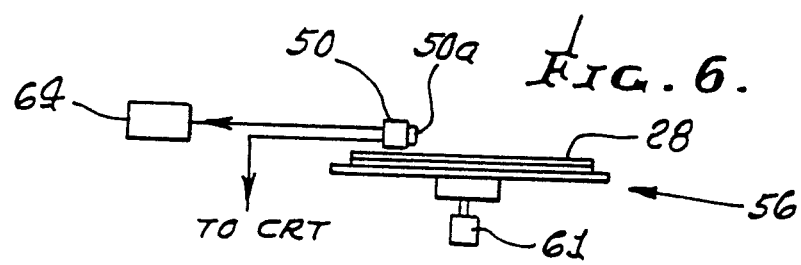
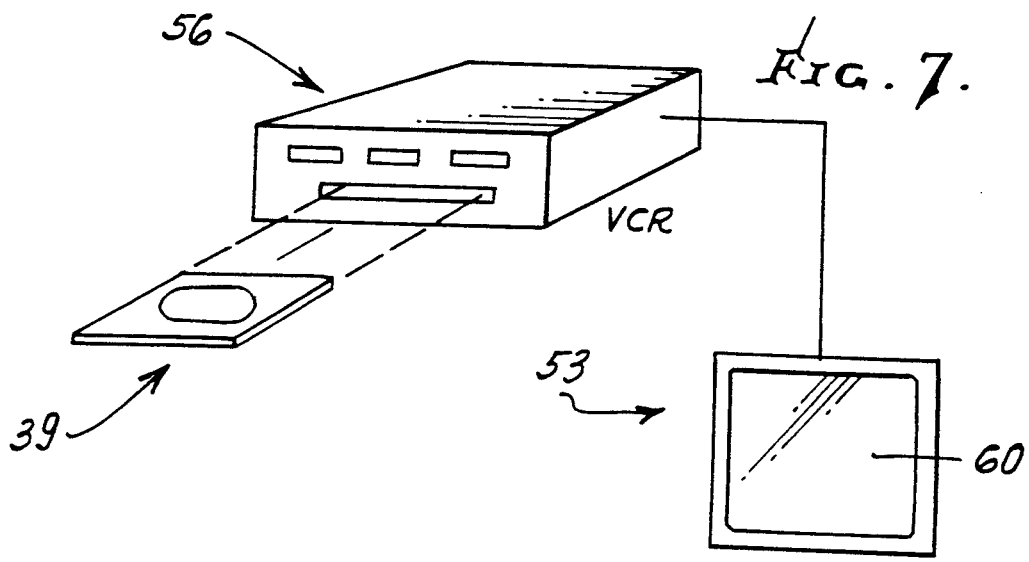

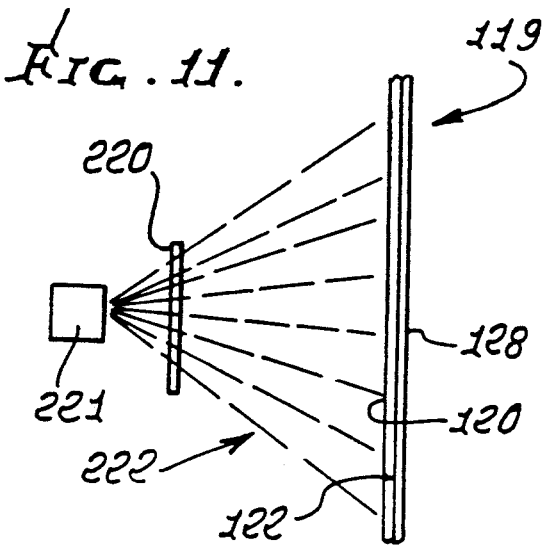
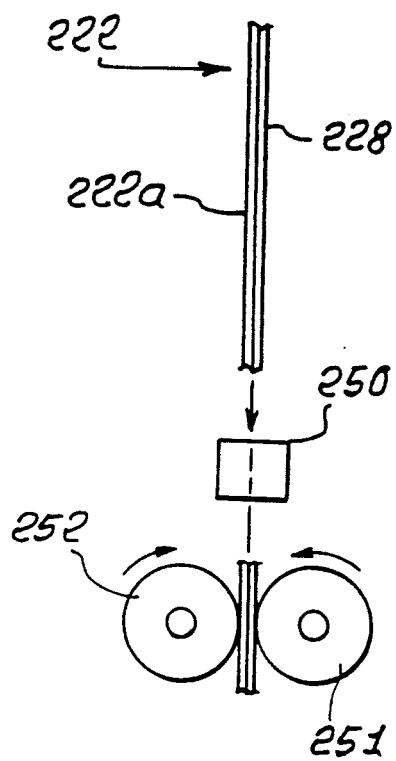
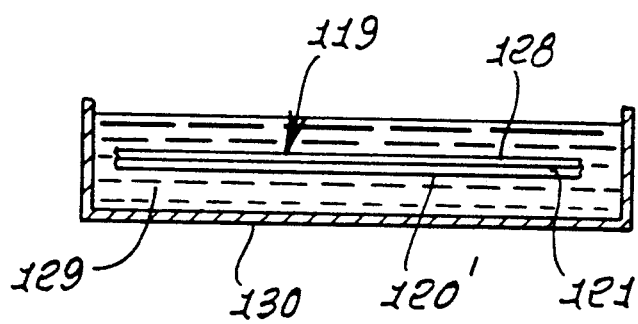
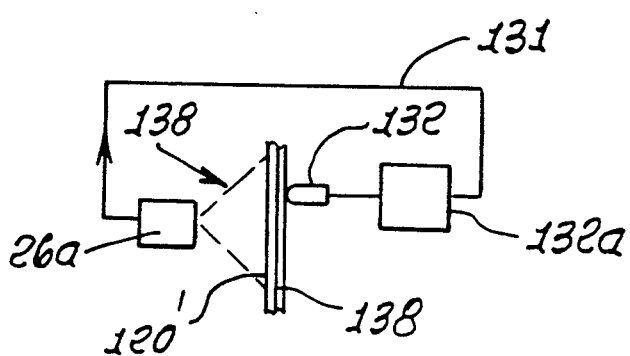

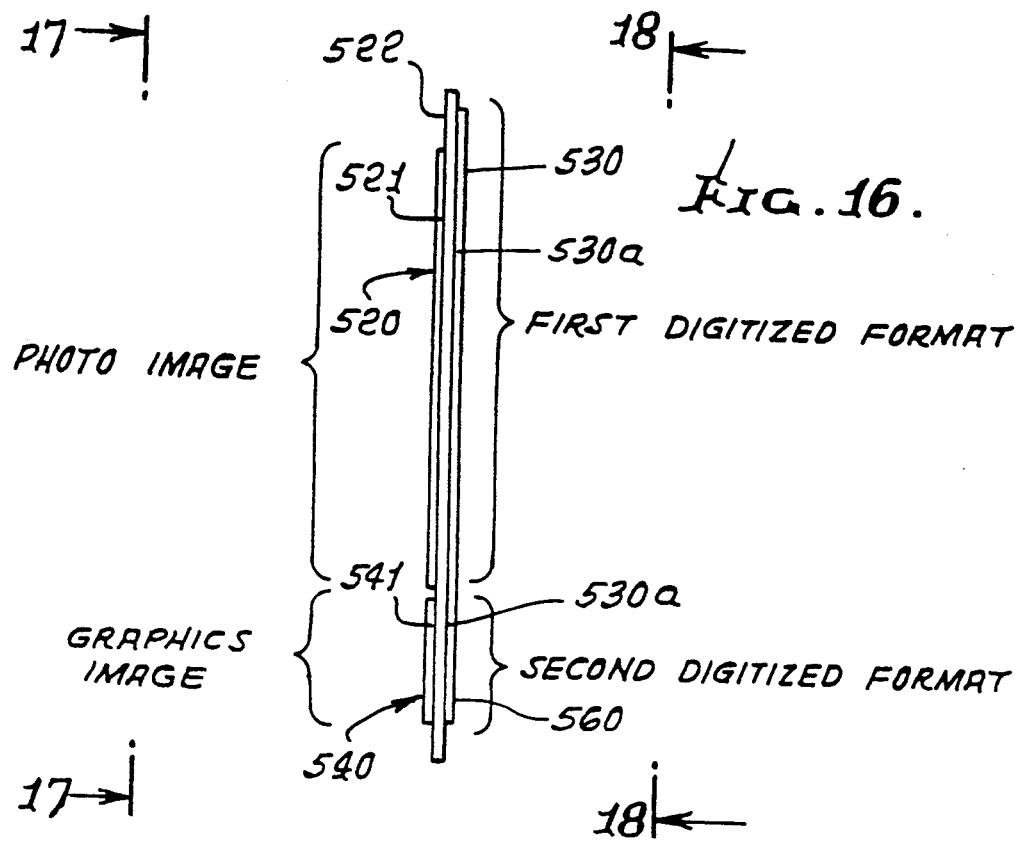
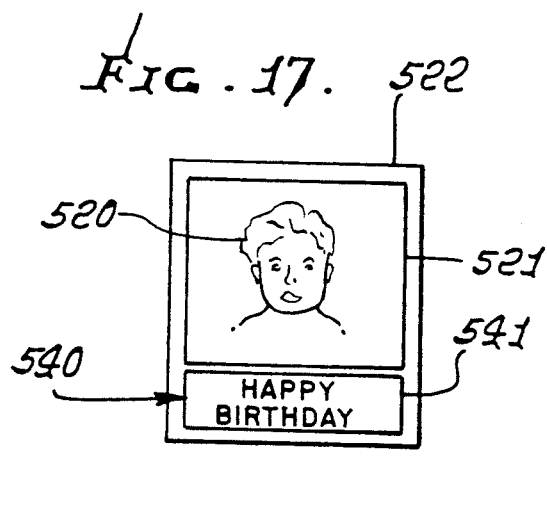
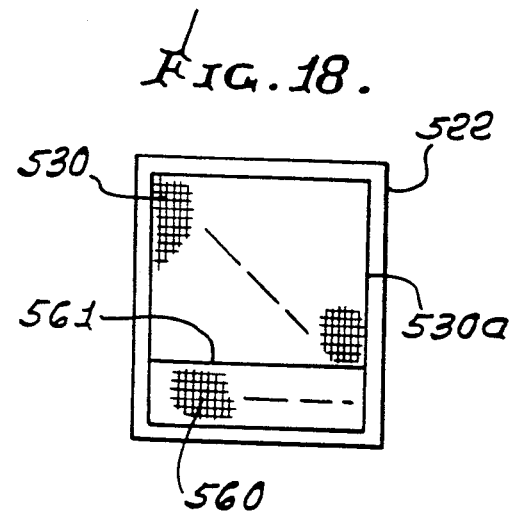

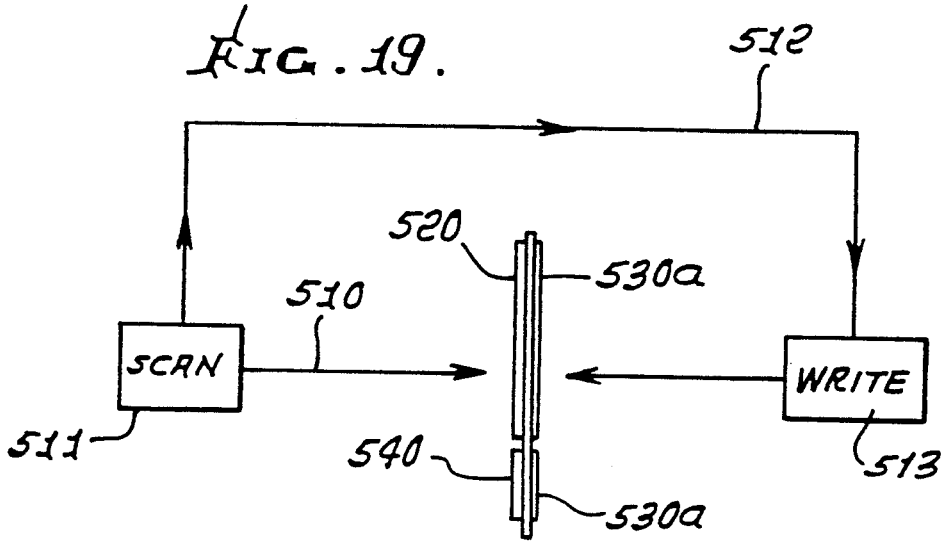
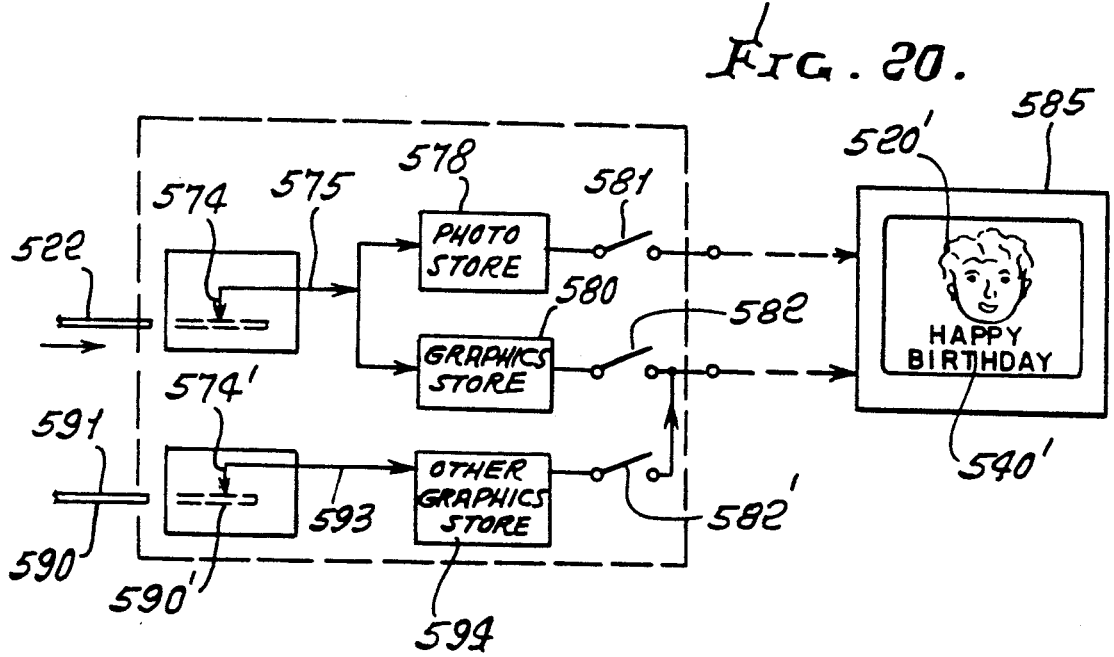
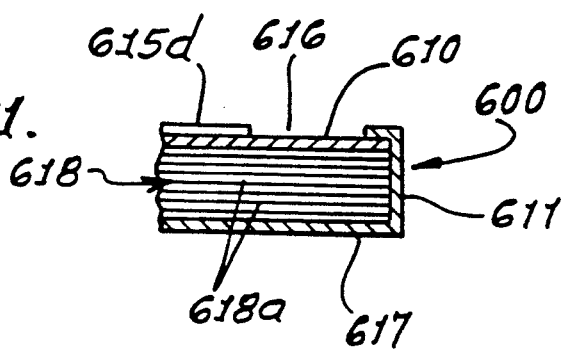

PHOTOGRAPH AND ASSOCIATED GRAPHICS WITH ASSOCIATED DIGITIZED FORMATTING, AND METHOD OF PRODUCTION AND USE THEREOF

BACKGROUND OF THE INVENTION

This application is a continuation-in-part of Ser. No. 679,249 filed Apr. 2, 1991, now abandoned, which is a continuation-in-part of Ser. No. 501,495 filed Mar. 30, 1990, now abandoned.

This invention relates generally to photographic displays, and more particularly, to production and use of composites each consisting of a photograph and a digitized version or format of the photographic image There is need for a means to quickly select a photograph from a group of photographs, and to quickly display same on a CRT (cathode ray tube), all without use of expensive equipment, such as camcorders. There is also need for means to selectively transmit, as over telephone lines, photographic images, without use of expensive, complex equipment. Further, there is need for such means, as referred to, capable of visually superimposing and viewing different readouts of photographic images, such as are produced by light and by infra-red rays.

SUMMARY OF THE INVENTION

It is a major object of the invention to provide method and means meeting the above needs. Basically, the combination is embodied in a composite that includes:

a) a carrier sheet of photograph size, and having front and back sides, and a camera-produced photographic image on a photographic print at the front side of the carrier sheet, and a graphics-produced image on at least one side of the sheet, b) a first digitized format on the back side of the carrier sheet, the format corresponding to the photographic image whereby the image is stored in the format, and a second digitized format on the back side of the carrier sheet, the second format corresponding to the graphics-produced image, the formats characterized as machine readable to produce a CRT display on the photographic image, and of the graphics-produced image in association with the photographic image display.

Typically, the digitized formats are located at the rear of the photo carrier sheet, and on a flexible layer attached to the carrier sheet. Each format consists of a sequence of magnetized transitions in a magnetic oxide coating on a substrate, and may be similar to a floppy disc, or the like.

In another form of the invention, the photograph has two print zones, the first zone characterized as a print developed from exposure to light rays of a light sensitive emulsion, and the second zone characterized as a print developed from exposure to infra-red rays of an infra-red sensitive emulsion, and the digitized format contains data produced as a result of scanning of both of such print zones. Those two zones are typically offset from one another, to produce stereo effect when read out and displayed, as will be seen.

The method of observing the selected photograph includes the steps:

a) reading the digitized format to produce corresponding electronic signals, and b) applying such signals, or versions thereof, to a CRT for displaying a visual image of the photograph.

Further, the method of producing the digitized format may include the steps:

a) optically scanning the photographic image to produce electronic signals, b) employing a magnetic write head to which the signals, or versions thereof, are transmitted for recording magnetic transactions defining the formats on magnetic oxide media.

The invention also concerns the provision of graphics on the carrier sheet in association with the photographic print, and digitizing such graphics for display. The step include:

a) affixing the photographic image and the graphics images on a carrier sheet, b) also affixing to the carrier sheet first and second digitized formats respectively corresponding to the photographic and graphics images, the formats characterized as machine readable to produce a CRT display on the images, c) subjecting the sheet to reading of the first and second formats to produce corresponding first signals and second signals, d) and selectively applying the first signals and second signals, or versions thereof, to a CRT for selectively displaying visual images of the photographic image and of the graphics image.

These and other objects and advantages of the invention, as well as the details of an illustrative embodiment, will be more fully understood from the following specification and drawings, in which:

BRIEF DRAWING DESCRIPTION

FIG. 4 is a front view of the composite of FIG. 3, together with a jacket enclosing same, forming a product;

FIG. 5 is a perspective view of a storage container for multiple products, as in FIG. 4, and enabling selection of a product to be displayed on a CRT, by visual inspection of photographic images;

FIG. 6 is a schematic view showing a method of reading the digitized format for CRT display;

FIG. 7 is a perspective view showing use of a VCR to read the digitized format for display by a CRT;

FIG. 11 is a view showing exposure of a photographic emulsion layer on a composite sheet;

FIG. 12 is a view showing chemical-bath development of the light-exposed emulsion layer of FIG. 11;

FIG. 12a is a view like FIG. 2a;

FIG. 13 is a view showing development of an "instant" photography emulsion layer on a composite sheet;

FIG. 16 is an enlarged edge view of a composite photographic print and graphics on one side of a carrier sheet; and digitized formats on the rear side of the sheet corresponding to the photo and graphics;

FIG. 17 is a frontal elevation taken on lines 17—17 of FIG. 16;

FIG. 18 is a rear elevation taken on lines 18—18 of FIG. 16;

FIG. 19 is a view like FIG. 2a but showing scanning of the front side of the FIG. 15 carrier sheet and writing of digitized formats on the rear side of that carrier sheet;

FIG. 20 is a schematic diagram showing selective readout of the stored data in digitized formats and selective display of same on a CRT; and FIG. 21 shows a film pack and template.

DETAILED DESCRIPTION

Figure 1:
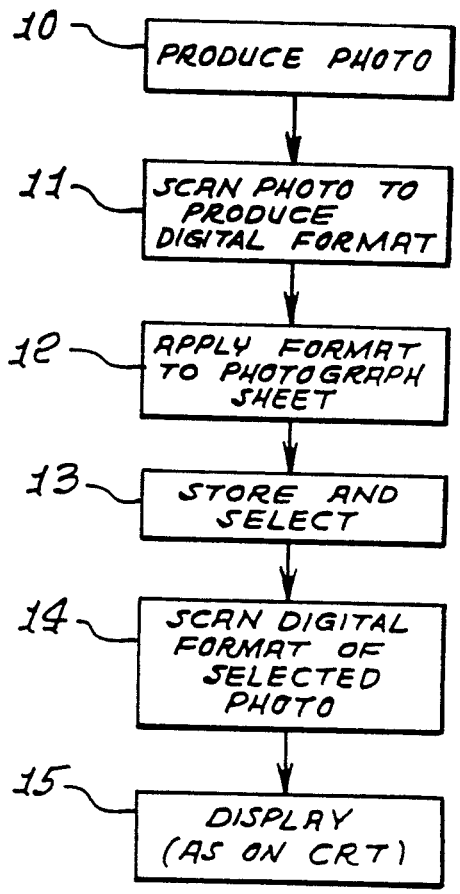
FIG. 1 is a block diagram showing a sequence of steps.
Figure 2:
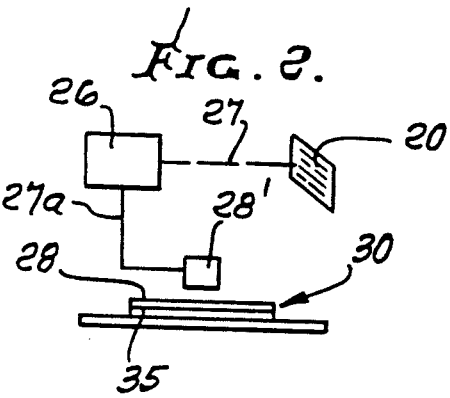
FIG. 2 is a schematic diagram showing scanning of a photographic image, and production of a digitized format on a carrier.
Figure 3:
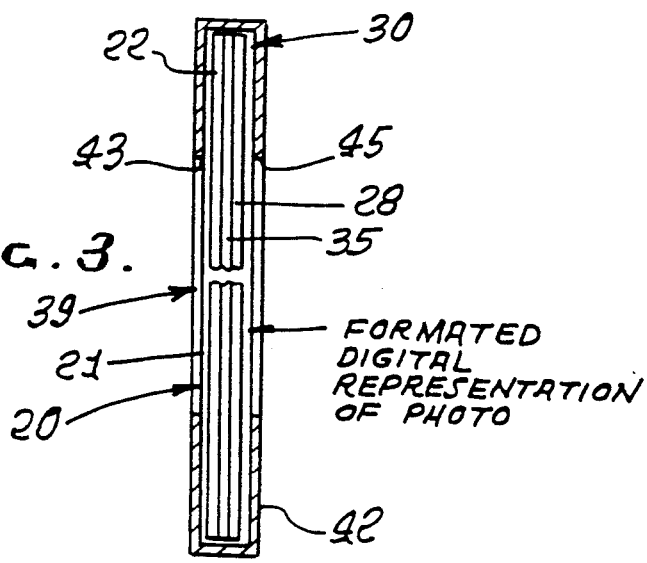
FIG. 3 is an enlarged edge view of a composite photograph, and a digitized format layer.

Step 10 in FIG. 1 indicates the production of a photograph, i.e., a photographic image 20 as on a photographic print 21 affixed to a carrier sheet 22. See FIG. 3. This may be done conventionally. Step 11 indicates scanning of the photographic image, as on a print, to provide a digital format. The latter is characterized as machine readable so as to produce a CRT (cathode ray tube) display of the photographic image. This can be done as in FIG. 2 showing use of an optical scanner 26, with beam scanning at 27 of photographic image 20. The scanner output (electrical digital signals) 27a is passed to a record (write) head 28' operable to record corresponding magnetic transitions of magnetic oxide media 28, and thereby defining the digital format. An example is the production of a floppy disc. the magnetic oxide being carried on a flexible substrate 35. The substrate may then be applied or adhered to the rear side of the photographic print flexible carrier sheet 22, as indicated in FIG. 3. The substrate and formatted magnetic oxide are indicated generally at 30; and the composite 39 (consisting of 22 and 30) is typically flexible in the same manner that a floppy disc is flexible.

Figure 2A:
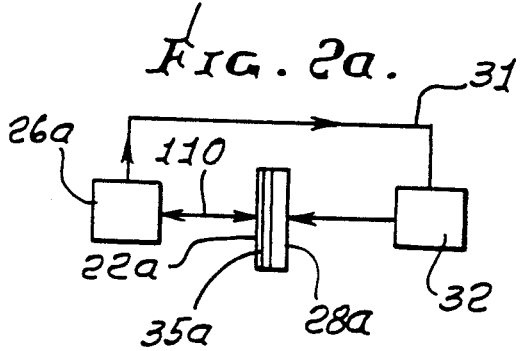
FIG. 2a is a schematic diagram showing simultaneous scanning and digitized format production.

FIG. 2a indicates an alternate technique wherein the image 20 is scanned at 110 by scanner 26a directly connected at 31 with the record means 32 for writing the digital format on the media 28a affixed to substrate 35a, which is in turn affixed to the carrier sheet 22a. Thus, reading (scanning) and writing (on media 28a) occur simultaneously. See step 12 in FIG. 1.

In FIGS. 3 and 4, the composite 39 is contained within a paper jacket or sleeve 42, with a front opening 43, in a manner similar to a floppy disc sleeve.

FIG. 5 shows multiple such sleeves 42 (and contained composites 39) arranged or stacked in a box 44 for selection as by viewing the photographs through jacket front openings 43. See step 13 in FIG. 1. Jacket rear openings 45 are provided in registration with the formatted media for subsequent reading of the media transitions. See FIG. 3.

FIG. 1, step 14, indicates the step of scanning the digitized format (readout) of a visually selected photograph (from the group as shown in FIG. 5). In this regard. FIG. 6 shows a scanner 56 (i.e., including a readout head 50) reading the magnetic transitions on the media 28. Such scanning may be repeated many times per second for application to a CRT. See for example the CRT 53 in FIG. 7 to which signals are transmitted via a scanner 56 that accepts the composite 39, and repeatedly reads the digitized format for outlay on screen 60.

FIG. 6 shows the readout head 50 adjacent the media 28 for magnetically reading the transitions, the media for example being rotated as by a drive 61. If desired, the head output may be transmitted to a memory 64 for storage, and subsequent display. Real time or delayed transmission of the head output over telephone lines is also contemplated.

Figure 8:
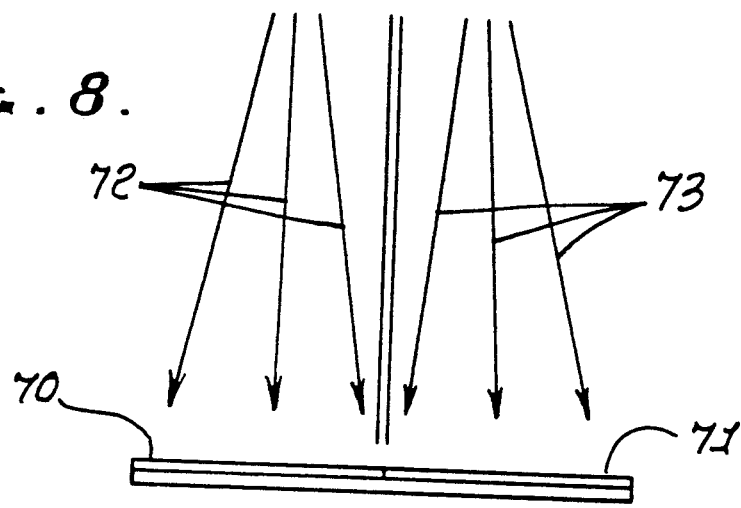
FIG. 8 shows production of a stereo-type photographic image.
Figure 9:
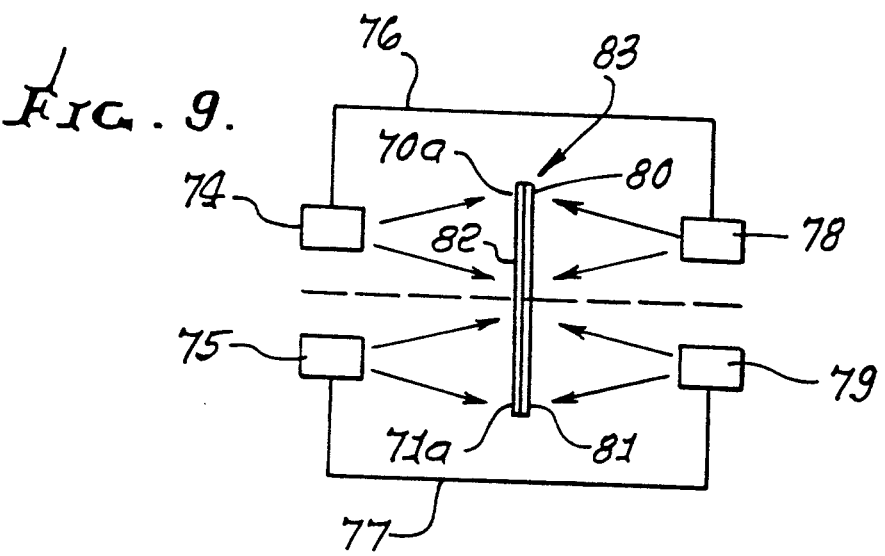
FIG. 9 shows apparatus scanning the FIG. 8 photograph, and apparatus recording such digital data on the record media at the rear side of the photo carrier.

FIG. 8 shows simultaneous exposure of film emulsion zones 70 and 71 to light rays 72, and to infra-red rays 73, respectively. Such rays emanate from the same object, for example a house or building. After development of the print, the corresponding print zones 70a and 71a are scanned at 74 and 75 in FIG. 9 to produce digital signals transmitted at 76 and 77 to write circuitry 78 and 79, including write heads. The latter write the digital data into the two corresponding record media zones 80 and 81 at the rear side of the composite photo carrier sheet 82.

Figure 10:
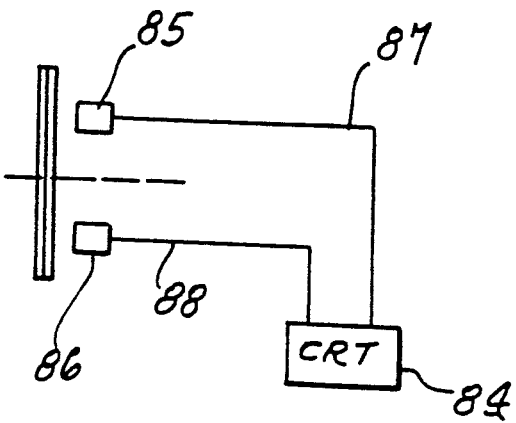
FIG. 10 shows reading of the recorded data to produce stereo data signals transmitted to a CRT.

The typically flexible composite 83 is then usable to produce a stereo image on the CRT 84 in FIG. 10. For example, the two read heads 85 and 86 are operated simultaneously to read the recorded digital data, the head outputs transmitted at 87 and 88 to the CRT equipment 84 to display the images in superimposed position. For example, the image of a house will appear on the screen, and any heat loss from the house will also appear (due to exposure at 71 in FIG. 8), the location of the heat loss being then evident.

FIG. 11 refers back to step 10, i.e., production of a photographic image 120, as on a photographic print sheet or carrier paper 122, in a conventional manner using a negative 220 and a light source 221 producing rays 222 passing through the negative and onto the photo-sensitive surface of paper 122. The surface may include silver nitrate. The carrier sheet or paper 122 also carries a layer 128 of magnetic oxide at its opposite side, the two previously compressed together as in a extrusion process.

FIG. 12 shows the composite 119 of 121 and 128 placed into a developing chemical bath 129, in a tray 130, for development of the final photographic image or print 120', at the side of the paper 122 opposite the oxide layer 128.

After drying, the print or image 120' is read at 138 using an optical scanner 26a, as also seen in FIG. 12a (corresponding to FIG. 2a). The output of the scanner is fed at 131 to circuitry 132a driving the write head 132, for writing magnetic transition data into the magnetic oxide layer, as the head is passed relatively over that layer. This step also corresponds to FIG. 2a. Accordingly, this aspect of the invention concerns the provision of a light sensitive unitary sheet having magnetic recording capability.

FIG. 13 shows application of the invention to instant or rapid-type photography, as in POLAROID film development. The sheet 222 is of POLAROID-type, at front side 222a, but carries a magnetic oxide layer 228 at its reverse side. A photographic emulsion layer (of POLAROID type) may be located at side 222a. After that layer is exposed to light to record an image, the composite sheet 222 is passed through a chemical treatment zone 250, for rapid development of the emulsion layer, as may be assisted by the pressure rollers 251 and 252 between which the sheet 222 is thereafter passed to pressurize the chemical application to the emulsion layer. The developed print is then optically scanned, as in FIG. 12a, and the electronic signal data from the scanner is passed to the write head for magnetic recording in layer 228 at the reverse side of the sheet.

Figure 14:
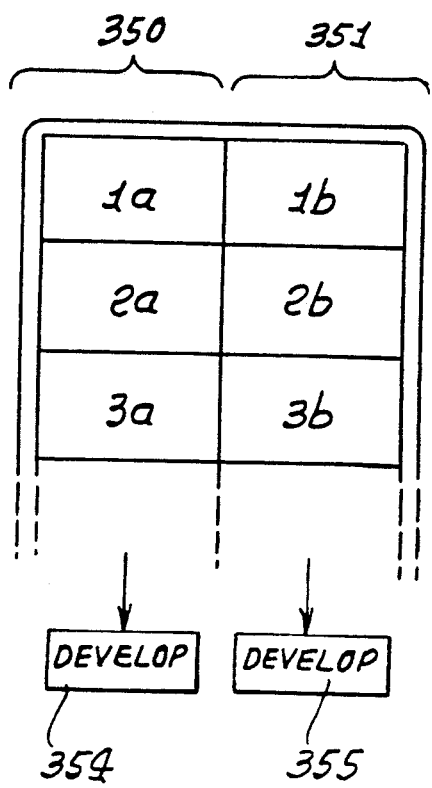
FIG. 14 is a view showing "stereo" located light and infra-red receiving zones on a composite carrier sheet of the invention.

In FIG. 14, corresponding to FIG. 8, the modified carrier sheet 322 has a "standard visible light photography side" 350, and an "infra-red (ray) photography side" 351. The same image (as of a building, etc.) is recorded at 1a and at 1b, these zones of the sheet being in side-by-side relation for ultimate stereo viewing. Zones 2a and 2b indicate another recorded picture or image, as do zones 3a and 3b, all on the same sheet. The left side of the sheet is passed through a standard photograph development step at 354, and the right side of the sheet is passed through an infra-red development step at 355 to produce two prints of the same image, one a visible, light-produced print, and the other an infra-red, ray-produced image.

Magnetic oxide coatings on the rear side of the sheet, to the rear of such zones 1a, 1b, etc., are then used to record data produced upon optical scanning of the prints at 1a, 1b, etc.

When viewed in a stereo viewer, the two zones at 1a and 1b are seen as superimposed; and when the recorded data on the rear side of the zones is transmitted simultaneously and in synchronization to a CRT, the two zones also appear as one, i.e., superimposed, as described previously.

Figure 15:
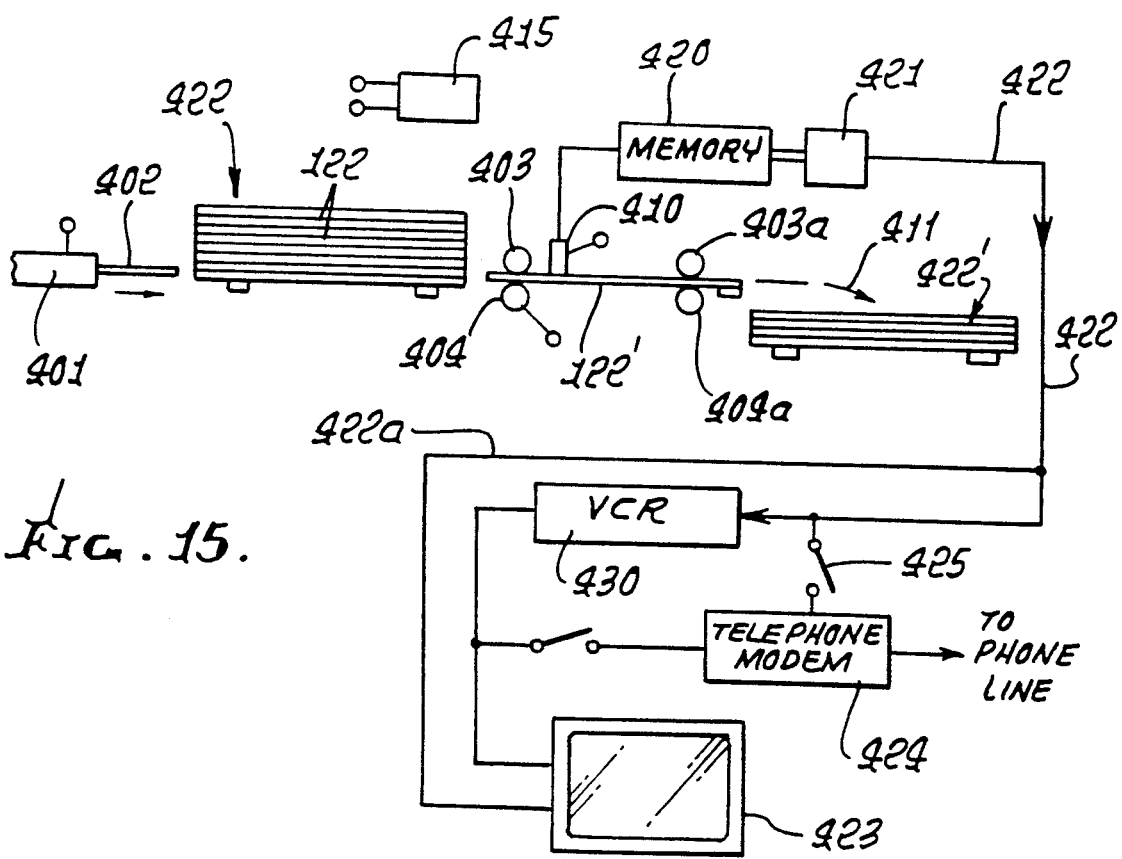
FIG. 15 is a view showing automatic reading of digitized zones on the reverse sides of a sequence of photographs.

In FIG. 15, a sequential reading apparatus is shown to read a sequence of composite sheets of the type 122 produced or described in FIGS. 11, 12a and 12, or FIG. 13, or FIG. 14. As shown, a stack of such sheets 122 is indicated at 422. An actuator 401 operates a reciprocating pusher 402, which sequentially pushes the lowermost sheet 122 in the stack to the right, to be advanced further to the right by drive rollers 403 and 404, and 403a and 404a. A sheet 122' is shown as being so advanced, and simultaneously read by the read head 410. After completion of advancement to the right, and reading, the sheets are discharged at 411 into the stack 422'. Sheets in stack 422 sequentially drop down into position to be driven to the right. A master control 415 controls timed operation of actuator 401, drive rollers 403 and 404, 403a and 404a, and lateral back and forth drive of the head 410.

Data read by head 410 is first stored in a memory 420. It is subsequently read out of memory as by circuitry 421 and passed at 422 to a CRT 423, and/or to a telephone modem 424 (via closing of switch 425), for transmission as corresponding signals on a telephone line. The transmission to 423 may be direct at 422a, or via a video cassette recorder 430, as in the case where the signals are recorded on a cassette tape or disc. Storage may also be on a chip usable in the VCR, or as input to the CRT.

The present invention allows conventional photographs and corresponding cameras to produce them, to enter and be useful in electronic imaging fields. Recording of X-ray images in two modes, as per the invention, may also be employed.

It is clear from the above the composite article comprises:

a) a carrier sheet of photograph size, and having front and back sides, and a camera-produced photographic image on the front side of the carrier sheet, and b) a digitized format affixed to the back side of the carrier sheet opposite the photographic image, the format corresponding to the photographic image whereby the image is stored in the format, the format characterized as machine readable to produce a CRT display of the photographic image.

By "photograph" size is meant a rectangular sheet less than about 6 inches by 4 inches.

In FIG. 6, audio data or messages may be stored in the same media 28, and read out by head 50 (or auxiliary head 50a) for transmission to a speaker and associated circuitry, as at the CRT indicated.

In the above, the carrier sheet 22, 22a or 122 may alternatively consist of magnetic oxide saturated plastic material, as in conventional floppy discs; and photo sensitive emulsion may be coated on a side of that saturated plastic material for use in producing the photographic print.

FIGS. 16-20 show another important aspect of the invention involving, for example, the combination comprising:

a) a carrier sheet of photograph size, and having front and back sides, and a camera-produced photographic image on a photographic print at the front side of the carrier sheet, and a graphics-produced image on at least one side of the sheet, b) a first digitized format on the back side of the carrier sheet, the format corresponding to the photographic image whereby the image is stored in the format, and a second digitized format on the back side of the carrier sheet, the second format corresponding to the graphics-produced image, the formats characterized as machine readable to produce a CRT display on the photographic image, and of the graphics-produced image in association with the photographic image display.

In the example seen in FIGS. 16-18, a carrier sheet 522 corresponds to sheet 35 described above. A photographic image 520, as on a photographic print 521, is affixed or printed on one side of sheet 522. Print 521 may be a photograph print (sheet) affixed to 522. In addition, a graphic image 540, as on a graphics print 541, is affixed or printed cn the opposite side of sheet 522. Print 541 may be a sheet (decal for example) affixed to 522, for example 521. Image 540 may be printed or produced directly o carrier sheet 522.

A first digitized format 530, corresponding to the photographic image 520, is affixed to the back side of the carrier 522. Format 530 may consist of magnetic transitions magnetically written into a magnetic oxide substrate 530a affixed to 522. Likewise, a second digitized or digital format 560, corresponding to the graphics image 540, is affixed to the back side of carrier 522. Format 560 may consist of magnetic transitions magnetically written into the substrate 530a, or another substrate, affixed to 522. Note in FIG. 18 the line 561 dividing the two formats. Merely for purposes of illustration, the graphics image may be represented by the message or greeting HAPPY BIRTHDAY, as shown.

Such graphics 540 may be produced on a photograph at the time of photo exposure. Thus, a graphics-bearing or protecting template may be employed to overlie a film in a film pack, as described in U.S. Pat. No. 4,717,930, incorporated by reference herein.

FIG. 21 herein schematically shows such an arrangement to include a template 610 adapted for use in conjunction with exposure of photographic film carried by structure that includes a frame, one such frame appears at 600 and includes side walls 611, a top cover having portion 615d, bordering an opening 616, and a bottom cover 617. That frame may consist of lightweight plastic material, as for example is exemplified by the POLAROID SX-70 LAND FILM frame for a film pack, as is seen at 618.

The template may have the form of a transparent, generally planar and rectangular plastic sheet adapted to cause an image to be reproduced on successive film sheets 618a. That image is successively reproduced on each sheet of film 618a as that sheet is exposed to light passing through the template and onto the film, as the camera (into which the film pack is inserted) is operated The template may consist of polyethylene about 0.005 inches thick, for example, and may have retainer tabs projecting a multiple edge portions of the sheet to removably fit beneath two or more of the frame border portions 615a–615d, thereby to removably retain the template to the frame structure so that the main central extent of the template overlies the stack of film in the pack carried by the frame. The template may, in another form, extend protectively over graphics on the film sheet in the pack, and when the film, after exposure, is removed from the pack, both the photo image and graphics may develop together while exposed to light.

FIG. 19 shows scanning at 510 of the images 520 and 540 by scanner 511 connected at 512 with circuitry 513 for writing the two digital formats 530 and 560 on the media 530a, affixed to the sheet 522. The media 530a may be on an associated substrate affixed to 522. Thus, reading and writing can occur simultaneously. Alternatively, the technique of FIG. 2 can be employed.

FIG. 20 shows the steps of
subjecting the sheet to reading of the first and second formats to produce corresponding first signals and second signals,
and selectively applying the first signals and second signals, or versions thereof, to a CRT for selectively displaying visual images of the photographic image and of the graphics image.
The last step may comprise simultaneously displaying the visual images and the graphics image at the CRT; alternatively, the last step may comprise displaying at the CRT visual images corresponding to only one of:
i) the photographic image, and
ii) the graphics image.

See in the FIG. 20 example the magnetic head 574 reader for reading the two formats on the carrier sheet 522, the output at 575 fed to magnetic storage (as on a chip) at 578 of the signals derived from the "photographic" format 530, and to a storage at 580 of the signals derived from the "graphics" format 560. Switch 581 controls transmission of the output from 57 to the CRT 585; and switch 582 controls transmission of the output from 580 to the CRT. Either of both switches may be operated, whereby either or both of the images 520 and 540 may be displayed on the CRT, as at 520' and 540', during a time interval.

FIG. 20 also shows the provision for other graphics display at the CRT. See auxiliary carrier sheet 590 carrying a digital graphics format 591, that carrier introduced at 590' to the auxiliary reader 574'. Readout from 574' is transmitted at 593 to another storage unit 594; and the switch 582' controls transmission from 594 to the CRT of other graphic signals for display in association with the image 520', or in association with image 540'.

I claim:
1. In combination, a composite comprising:
a) a carrier sheet having front and back sides, and a camera-produced photographic image on a photographic print at said front side of the carrier sheet, and a graphics-produced image on at least one side of said sheet,
b) a first digitized format on said back side of said carrier sheet, said format corresponding to said photographic image whereby the image is stored in the format, and a second digitized format on said back side of said carrier sheet, said second format corresponding to said graphics-produced image, said formats characterized as machine readable to produce a CRT display of the photographic image, and of said graphics-produced image in association with said photographic image display.
2. The combination of claim 1 wherein said digitized format is within an area less than about 6 inches by 4 inches.
3. The combination of claim 1 wherein each format is on a flexible layer affixed to the carrier sheet.
4. The combination of claim 3 wherein said format comprises a floppy disc.
5. The combination of claim 3 wherein said carrier sheet and said format layer are both flexible, the carrier sheet comprising paper.
6. The combination of claim 5 wherein said two zones are offset from one another.
7. The combination of claim 1 wherein said formats consist of a sequence of magnetized transitions in a magnetic oxide coating on a substrate.
8. The combination of claim 1 wherein said photograph print has two zones, the first zone characterized as a print developed from exposure to light rays of a light sensitive emulsion, and the second zone characterized as a print developed from exposure to infra-red rays of an infra-red sensitive emulsion, and said digitized format containing data produced as a result of scanning of both of said print zones.
9. The combination of claim 8 wherein said two zones have stereo offsetting in side-by-side relation.
10. The method of observing said photograph of claim 1, which includes the steps
a) first identifying said photographic image on said sheet as one to be reproduced on a CRT, and then subjecting said sheet to reading of said first and second digitized formats to produce corresponding electronic signals, and
b) applying said signals, or versions thereof, to a CRT for displaying a visual image of the photograph.
11. The method of producing the digitized format of claim 1 which includes the steps
a) optically scanning the photographic and graphics images to produce electronic signals,
b) employing a magnetic write head to which said signals, or versions thereof, are transmitted for recording magnetic transactions defining said formats on magnetic oxide media.
12. The method of claim 11 wherein said media is affixed to said carrier sheet when said recording of the transitions is carried out.
13. The combination of claim 1 including a flexible sleeve containing said composite, the sleeve having openings t permit viewing of the photograph and readout of said digitized format.
14. The combination of claim 1 wherein said photographic image is characterized as on of the following:

i) produced by conventional photography,
ii) produced by instant photography, and said image is at one side of the sheet and said digitized format is at the opposite side of the sheet.

15. The combination of claim 1 including multiple of said composites, and means for receiving said composites supplied automatically and in sequence, and for reading said digitized format of each supplied composite for viewing on a CRT.

16. The combination of claim 1 wherein said carrier sheet consists of magnetic oxide distributed in carrier plastic material.

17. The method of displaying a photographic image and an associated graphics image, that includes
   a) affixing said photographic image and said graphics images on a carrier sheet in the form of a card,
   b) also affixing to said carrier sheet first and second digitized formats respectively corresponding to said photographic and graphics images, said formats characterized as machine readable to produce a CRT display of the images,
   c) subjecting said sheet to reading of said first and second formats to produce corresponding first signals and second signals,
   d) and selectively applying said first signals and second signals, or versions thereof, to a CRT for selectively displaying visual images of said photographic image and of said graphics image.

18. The method of claim 17 wherein said d) step includes simultaneously displaying said visual images and said graphics images at said CRT.

19. The method of claim 17 wherein said d) step includes displaying at said CRT visual images corresponding to only one of:
   i) said photographic image, and
   ii) said graphics image.

20. In the method of producing a photograph having associated graphics and employing a film pack, including a stack of photographic film sheets, the sheets having first zones which are photographic exposure zones, and second zones, which are graphics zones, the steps including:
   a) effecting production of a photographic image on the first said zone on one of said sheets, and of a graphic image on a second said zone on said one sheet, said effecting step including employing a template on the film pack in registration with said second zone, thereby to produce a photographic print on a print sheet displaying said photographic image and also displaying said graphic image,
   b) and employing said print in one auxiliary image display mode.

21. The method of claim 20 including carrying out said steps a) and b) with respect to multiple of the film sheets in said film pack.

22. The method of claim 20 wherein said auxiliary display mode is a CRT display mode.

23. The method of providing a composite comprising:
   a) providing a carrier sheet having front and back sides, providing a camera produced photographic image on a photographic print at said front side of the carrier sheet, and
   b) providing a digitized format no said back side of said carrier sheet opposite said photographic image, said format corresponding to said photographic image whereby the image is stored in the format, said format characterized as machine readable to produce a CRT display of the photographic image.

24. The method of claim 23 wherein said digitized format is provided within an area less than about 6 inches by 4 inches.

25. The method of claim 23 wherein said format is provided on a flexible layer and affixing said layer to the carrier sheet.

26. The method of claim 25 wherein said format is provided as a floppy disc.

27. The method of claim 25 wherein said carrier sheet and said format layer are both provided to be flexible.

28. The method of claim 27 wherein said two zones are provided to be offset from one another.

29. The method of claim 23 wherein said format is provided to consist of a sequence of magnetized transitions in a magnetic oxide coating on a substrate.

30. The method of calm 23 wherein said photograph is provided to have two zones, the first zone characterized as a print developed from exposure to light rays of a light-sensitive emulsion, and the second zone characterized as a print developed from exposure to infra-red rays of an infra-red sensitive emulsion, and said digitized format is provided to contain data produced as a result of scanning of both of said print zones.

31. The method of claim 30 wherein said two zones are provided to have stereo offsetting, in side-by-side relation.

32. The method of observing said photograph, of claim 23, which includes the steps of:
   a) first identifying said photographic image on said sheet as one to be reproduced on a CRT, and then subjecting said sheet to reading of said digitized format therefor to produce corresponding electronic signals, and
   b) applying said signals, or versions thereof, to a CRT for displaying a visual image of the photograph.

33. The method of producing the digitized format of claim 23, which includes the steps:
   a) optically scanning the photographic image to produce electronic signals,
   b) employing a magnetic write head to which said signals, or versions thereof, are transmitted, for recording magnetic transitions defining said format on magnetic oxide media.

34. The method of claim 33 wherein said media is affixed to said carrier sheet when said recording of the transitions is carried out.

35. The method of claim 23 including providing a flexible sleeve containing said composite, the sleeve having openings to permit viewing of the photograph and read-out of said digitized format.

36. The method of claim 23 wherein said photographic image is characterized as produced by one of the following:
   i) produced by conventional photography,
   ii) produced by instant photography, and said image is provided at one side of the sheet and said digitized format is provided at the opposite side of the sheet.

37. The method of claim 23 including providing multiple of said composites, and providing means receiving said composites supplied automatically and in sequence, and reading said digitized format of each supplied composite, for viewing on a CRT.

38. The method of claim 23 wherein said carrier sheet is formed to consist of magnetic oxide distributed in carrier plastic material.

* * * * *